United States Patent

[11] 3,607,534

[72] Inventor Isaj Gutman
 Harrow, England
[21] Appl. No. 823,012
[22] Filed May 8, 1969
[45] Patented Sept. 21, 1971
[73] Assignee Flexigrip, Inc.
 Orangeburg, N.Y.
[32] Priority May 9, 1968
[33] Great Britain
[31] 22,073/68

[54] BAGMAKING APPARATUSES
 12 Claims, 7 Drawing Figs.
[52] U.S. Cl. .................................................. 156/269,
 156/515
[51] Int. Cl. ....................................................... B32b 7/06
[50] Field of Search .......................................... 156/269,
 515, 353; 29/207.5, 408, 409; 93/33; 24/205, 201
 C

[56] References Cited
UNITED STATES PATENTS

| | | | |
|---|---|---|---|
| 2,705,443 | 4/1955 | Colby | 93/33 |
| 2,800,163 | 7/1957 | Rusch | 156/269 X |
| 2,971,874 | 2/1961 | Canno | 156/269 X |
| 3,051,103 | 8/1962 | Williams | 156/269 X |
| 3,079,292 | 2/1963 | Garth | 156/269 |
| 3,094,083 | 6/1963 | Weeks | 156/269 X |
| 3,166,457 | 1/1965 | Nichols | 156/269 |
| 3,430,329 | 3/1969 | Ausnit | 29/408 |

Primary Examiner—Benjamin A. Borchelt
Assistant Examiner—Daniel Bent
Attorney—Hill, Sherman, Meroni, Gross & Simpson ABSTRACT: The bagmaking apparatus comprises a supply supplying intermittently a flattened tube of synthetic material having a lateral fastener; a transverse cutting and welding device; a device for placing a slider on the fastener of each tube element delimited by the cuts and welds; and a welding device for welding the cut portions of the tube elements.

INVENTOR
Isaj Gutman

ATTORNEYS

INVENTOR
Isaj Gutman

ATTORNEYS

BAGMAKING APPARATUSES

This invention relates to methods and apparatus for making bags from a flattened tube of synthetic material, having, along one of its edges, a longitudinal slit closed along its entire length by a seam formed by mated male and female fastener elements provided in the neighborhood of this slit and carried respectively by the two lips of the slit.

An object of this invention is to provide a practical method and apparatus which, in particular, permit the bags to be made automatically.

The method according to this invention is principally characterized by the fact:

that, in the intermittently advancing tube, a transverse cut is effected, during each stop of the tube, which severs, from the above-mentioned edge of the tube, the mated male and female fastener elements as well as the tube along only a portion of its width;

that a first transverse weld of the walls of the tube is effected, during each stop of the tube, along the rest of the width of this tube in line with said cut;

that the tube element delimited by the cuts and welds is separated from the rest of the tube, during each stop of the tube;

that the severed ends of the mater fastener elements are spread apart from each other by a determined angle, at one side of each tube element;

that a slider is threaded onto the thus spread-apart ends of the fastener elements, along the longitudinal direction of the seam;

that this slider is moved along the fastener considered by a distance greater than the length of this slider;

and, that second transverse welds are effected in line with the first transverse welds, thus joining together the severed portions of each tube element.

Apparatus according to this invention, for carrying out the method defined above, advantageously comprises a cutting device and a first welding device receiving the flattened tube supplied intermittently from a supply, this cutting device and the first welding device forming a unit comprising a welding knife, a cutting blade and a work surface on which the flattened tube is intermittently advanced. First mechanical means are provided for bringing the cutting blade above a first portion of the work surface, for making this blade descend on said work surface and for then moving this blade away from said first portion. Second mechanical means are provided for moving the welding knife such that the tube is temporarily gripped between a second portion of the work surface and this welding knife, the first and the second portion being contiguous, and preferably overlapping, these second mechanical means being arranged such that the cutting blade first severs the flattened tube and is then moved away, before the welding knife is actuated in order to free the passage for the welding knife.

The apparatus according to conveyors and invention advantageously further comprises two superimposed belt conveyors, the lower conveyor carrying the flattened tube on its conveying surface and the upper conveyor being adapted to effect an alternating movement such that the flattened tube is, after each cutting and welding operation on the tube, temporarily gripped between at least a portion of a conveying surface of the two conveyors and is thus subjected to traction causing the separation of a tube element.

The apparatus according to this invention advantageously further comprising an opening device comprising two vacuum fingers carried by pivoting arms and adapted to engage the walls of a tube element along the surfaces which are adjacent both to the male and female fastener elements and to a severed side of the tube element, and adapted then to separate these walls from each other, together with the ends of the fastener elements, by the above-mentioned determined angle.

This opening device advantageously comprises an element in the form of a wedge presenting the above-mentioned determined angle and adapted to be inserted between the separated walls of the tube element for separating the fastener elements along a length greater than the length of a slider. The opening device can also comprise means for directing a jet of air towards the interior of the tube element between the separated walls.

The apparatus according to this invention advantageously comprises a positioning and orientating device adapted to present to the opening device each tube element coming from the separation device, so that the opening device can carry out its work.

The device for positioning and orienting the tube elements advantageously comprises:

a plate on which the separation device successively projects the tube elements, flat and along a determined direction parallel to the longitudinal direction of the slit of these tube elements;

first advancing means adapted to advance a tube element along that direction towards a first barrier which borders the plate perpendicularly to said direction and which is removable;

second advancing means adapted to advance a tube element towards a second barrier which orders the plate parallel to said direction, and detection means disposed along said barriers and adapted to control the action of the second advancing means when a tube element abuts against the first barrier by its severed and welded side, these detection means cutting off the action of the second advancing means when this tube element abuts against the second barrier by its side comprising the fastener elements and actuating the opening device which carries out its work on the severed side of the tube element which bears against the first barrier.

The first advancing means can be constituted by nozzles projecting jets of air onto the tube element and the second advancing means can be constituted by a roller rotating about an axis parallel to the above-mentioned direction and projecting slightly above the plate, between this plate and the second barrier.

A particular embodiment of the invention will now be described by way of example with reference to the accompanying drawings in which.

Figure 1:
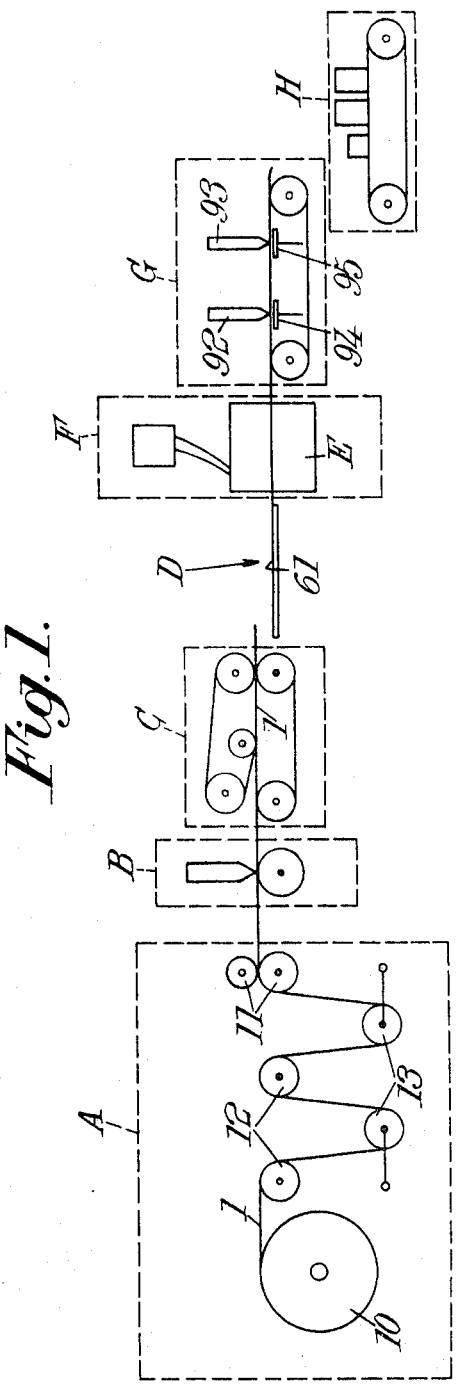
FIG. 1 shows schematically an apparatus according to this invention, for making bags.

The bag-making apparatus shown in the drawings comprises:

a supply A supplying, with an intermittent advance, a flattened tube 1 of synthetic material such as polythene, a cutting device and a first welding device formed as a unit B, the cutting device receiving the flattened tube 1 and being adapted to effect, during each stop of the advance of the tube, a transverse cut severing, from the edge 2 of the tube 1, the complementary fastener elements and the tube along only a portion of its width, the first welding device being adapted to effect, during each stop of the advance of the tube, a first transverse weld of the walls of the tube, in line with each cut, along the rest of the width of this tube and preferably also along a fraction of the cut adjacent to the rest of the width;

a separation device C adapted to separate from the tube 1, during each stop of the advance of the tube, the tube element delimited by the cuts and the welds;

a positioning and orientating device D adapted to present to an opening device E each tube element coming from the separation C, so that this opening device E can carry out its work;

a guiding device F adapted to thread a slider (not shown) onto the thus opened or spread-apart ends along the longitudinal direction of the slit, and to move this slider along the fastener considered by a distance greater than the length of this slider;

a second welding device G adapted to effect second transverse welds, in line with the first transverse welds, thus joining together the severed portions of each tube element;

and finally, a stacking device H adapted to stack the tube elements forming the bags, on a belt conveyor (not shown).

The flattened tube which is fed continuously into the supply A can be formed by extrusion to produce an initial tube having two internal longitudinal beads, one forming a male fastener element and the other a female fastener element. The extruded tube is flattened, in the process of which the fastener elements are mated to from a double tube having a figure of light cross section. The smaller lobe of the figure of eight is then cut off close to the fastener elements to leave a flattened tube having, along one of its edges, a longitudinal slit closed along its entire length by a seam formed by the mated fastener elements.

Such a flattened tube can also be formed from a sheet obtained by extrusion and comprising, along its edges, complementary male and female fastener elements. This sheet is then folded at the same time as the complementary fastener elements are mated together.

Whatever be the manner in which the flattened tube 1 is obtained, this tube is continuously fed into the supply A which comprises a first roller 10 on which the tube 1 passes. This supply A comprises output rollers 11 between which the tube 1 passes before being fed into the unit B; between the rollers 10 and 11 there is provided a series of fixed rollers 12 and a series of movable rollers 13 on which the tube 1 passes. An alternating movement of the rollers 13 (controlled for example by cam devices) permits the supply A to feed, with an intermittent advance, the flattened tube 1 that it receives continuously.

Figure 2:
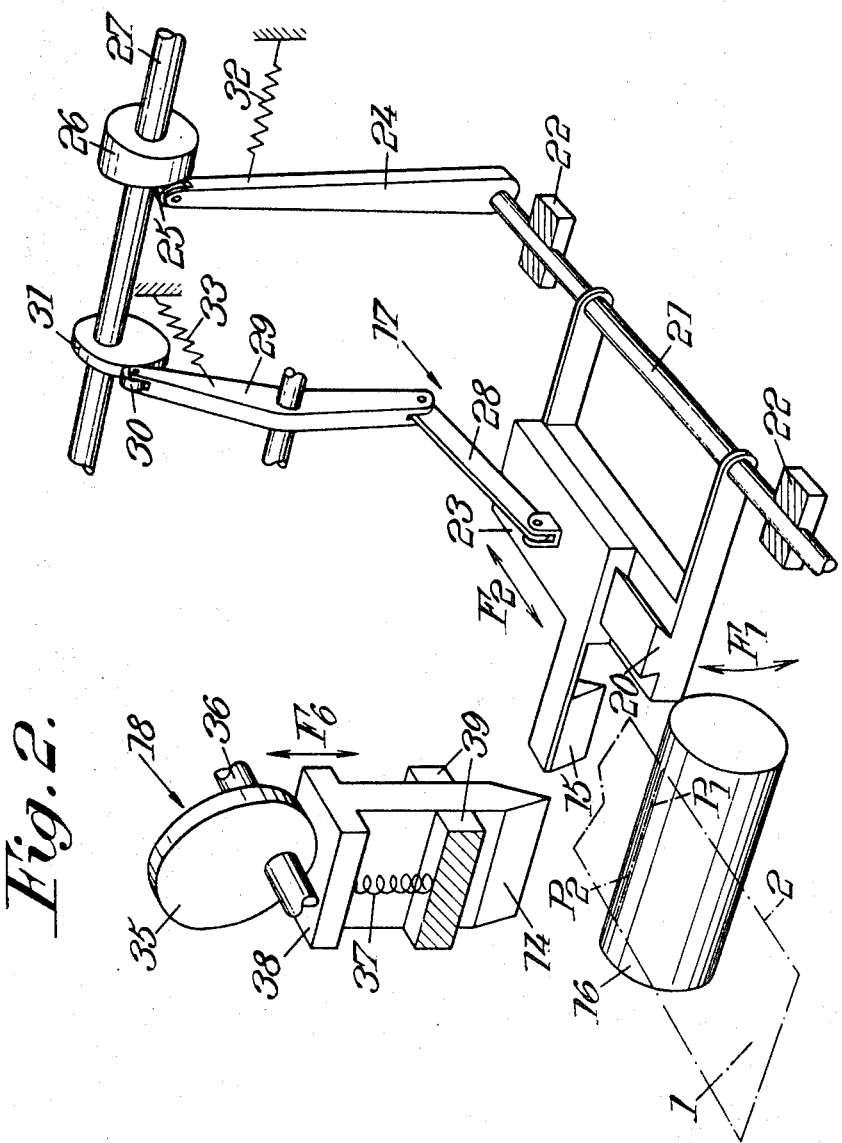
FIG. 2 shows in perspective part of the cutting device and of the first welding device of the apparatus of FIG. 1.

In FIG. 2 there is shown the unit B. This unit B comprises a welding knife 14, a cutting blade 15 and a work surface 16 along which is intermittently advanced the flattened tube 1 (shown in broken lines in FIG. 2). First mechanical means 17 are provided for bringing the cutting blade 15 above a first portion $P_1$ of the work surface 16, for making this blade 15 descend on the work surface 16 and for then moving this blade 15 away from the first portion $P_1$. Second mechanical means 18 are provided for moving the welding knife 14 such that the tube 1 is temporarily gripped between a second portion $P_2$ of the work surface 16 and the welding knife 14. The first portion $P_1$ and the second portion $P_2$ are contiguous and preferably they partially overlap; the mechanical means 17 and 18 are arranged so that the cutting blade 15 first severs the flattened tube 1 and is then moved away, before the welding knife 14 is actuated, in order to free the passage for this welding knife 14.

The mechanical means 17 advantageously comprise a slideway 20 which is carried by a spindle 21 mounted on fixed bearings 22. This slideway 20 has a dovetail profile and guides a carriage 23 which carries the cutting blade 15. The ensemble formed by the slideway 20, the carriage 23 and the cutting blade 15 can effect an oscillating movement according to the arrow $F_1$ under the action of a lever 24 which is solidly secured to the spindle 21 to rotate with this spindle 21; the lever 24 bears, by the intermediary of a wheel 25, against a bell-cam 26 carried by a shaft 27 driven in rotation. The carriage 23 can effect, with respect to the slideway 20, a reciprocating movement according to the arrow $F_2$ under the action of a rod 28 which is controlled by a level 29 bearing via a wheel 30 against a cam 31 carried by the shaft 27. The wheels 25 and 30 are respectively applied against the cam 26 and 31 by the intermediary of springs 32 and 33.

An appropriate choice of the active surfaces of the cams 26 and 31 causes, in the course of the rotation of the shaft 27, the movement of the carriage 23 in the direction of the arrow $F_2$, which movement brings the cutting blade 15 above the portion $P_1$ and a pivoting movement of the slideway 20 which causes the severing, by the cutting blade 15, of a portion of the width of the flattened tube 1, and then the reverse movements of the slideway 20 and the carriage 23 which move the cutting blade 15 away from the portion $P_1$.

The second mechanical means 18 are constituted by a cam 35 which is driven in rotation by a shaft 36 whose angular position is determined with respect to that of the shaft 27, this cam 35 bearing, in opposition to the action of a spring 37, on a surface 38 of the welding knife 14 which is slidably mounted in guides 39.

Rotation of the shaft 36 causes ascending and descending movements of the welding knife 14 (according to the arrow $F_6$) which can thus press the flattened tube 1 against the portion $P_2$ of the work surface 16.

An appropriate choice of the active surface of the cam 35 causes the welding knife 14 to descend only when the cutting blade 15 has been moved away from the portion $P_1$ of the work surface 16.

Figure 3:
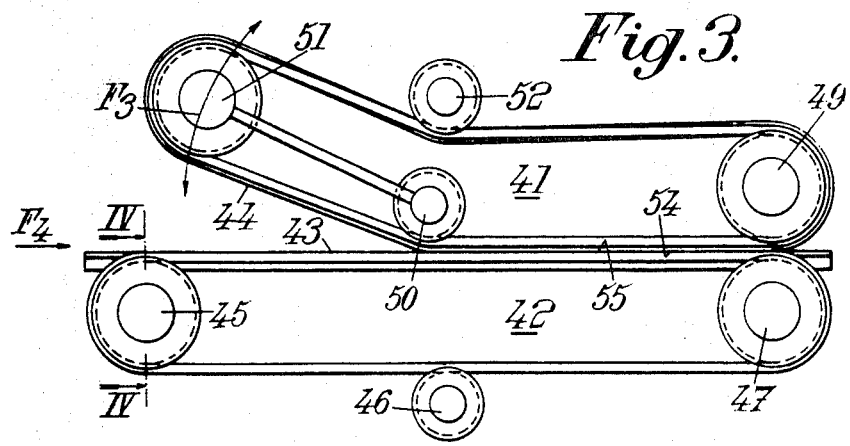
FIG. 3 shows in side view a separation device of the apparatus of FIG. 1.
Figure 4:
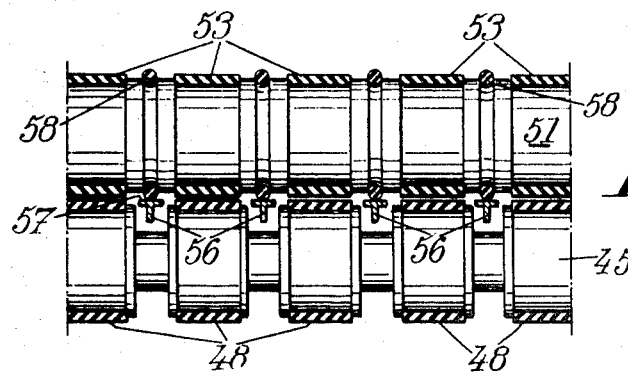
FIG. 4 shows, in section along the line IV—IV, the separation device of FIG. 3.

The separation device C shown in FIGS. 3 and 4 comprises two belt conveyors 41 and 42 which move continuously and which are superimposed; the lower conveyor 42 carries the flattened tube 1 on its conveying surface 43 and the upper conveyor 41 is adapted to effect an alternating movement such that the flattened tube 1 is, after each cutting and welding operation effected by the unit B, temporarily gripped between at least a portion of the conveying surfaces 43 and 44 of the two conveyors 41 and 42.

According to a preferred embodiment, the lower conveyor 42 comprises rollers 45, 46 and 47 which drive the belts 48 of the conveyor and which occupy fixed positions so that the conveying surface 43 of this conveyor has itself a fixed position. The upper conveyor 41 comprises rollers 49, 50, 51 and 52 which drive the belts 53 of the conveyor, the rollers 49 and 50 occupying a fixed position such that the portion 54 of the conveying surface 44 of this conveyor is permanently adjacent to the portion 55 of the conveying surface 43 of the conveyor 42; the roller 51 is adapted (for example under the action of the cam device not shown) to effect, with respect to the conveyor 42, an alternating movement according to the arrow $F_3$, in the course of which movement the remaining portions of the conveying surfaces 43 and 44 are temporarily rendered adjacent.

The portions 54 and 55 are advantageously the downstream portions of the conveying surfaces 43 and 44 with respect to the sense of the movement $F_4$ of the flattened tube 1 between these conveying surfaces.

Preferably there are provided, between the belts 48 of the conveyor 42, metal T-section bars 56 having a low coefficient of friction with respect to the flattened tube 1 and having, at the level of the conveying surface 43 of the conveyor 42, a plane face 57; and the driving roller 51 of the conveyor 41 comprises toroidal rings 58 made of a material having a high coefficient of friction with respect to the flattened tube 1, the rings 58 being disposed such that, when the driving roller 51 brings the remaining portions of the conveying surfaces 43 and 44 adjacent to each other, these rings 58 urge the flattened tube 1 against the T-section bars 56, and exert a supplementary traction on the tube 1.

The rollers 46 and 52 have the role of maintaining the belts 48 and 53 of the conveyors 42 and 41 under tension.

During the cutting and welding operations which are carried out by the unit B, the supply A interrupts the advance of the flattened tube 1 and this flattened tube 1, which rests on the conveying surface 43 of the conveyor 42, is thus maintained under tension in the unit B, which favors the operations of cutting and welding. When these operations are finished the driving roller 51 brings the remaining portions of the conveying surfaces 43 and 44 adjacent to one another (the portions of the driving roller 51 is shown in the sectional view FIG. 4), which permits the rings 58 to press the flattened tube 1 against the Tisection bars 56. Since the advance of the tube is still interrupted, the traction exerted on the tube by the conveying surfaces 43 and 44 and by the rings 58 is sufficient to separate the cut and welded tube element from the flattened tube 1 remaining upstream of the unit B.

Figure 5:
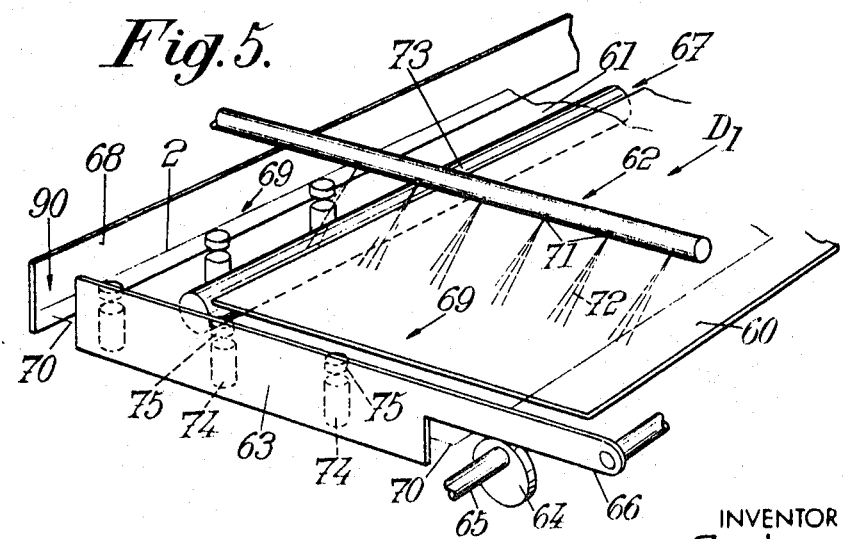
FIG. 5 shows, in perspective with parts removed, a positioning and orientating device forming part of the apparatus of FIG. 1.

The positioning and orientating device D, with in FIG. 5, is adapted to present to the opening or spreading apart device E each tube element coming from the separation device C, so that this opening device E can carry out its work. The positioning and orienting device D advantageously comprises a plate 60 onto which the separation device C projects successively the tube elements 61, flat and along a determined direction $D_1$ parallel to the longitudinal direction of the slit of these tube elements 61.

This device D further comprises first advancing means 62 adapted to advance a tube element 61 in the direction $D_1$ towards a first barrier 63 which borders the plate 60 perpendicular to the direction $D_1$ and which is removable under the action of a cam 64 carried by a spindle 65 driven in rotation, this cam 64 bearing on a surface 66 of the barrier 63.

This device D further comprises second advancing means 67 adapted to move a tube element 61 towards a second barrier 68 which borders the plate 60 parallel to this direction $D_1$.

The device D finally comprises detection means 69 disposed along these barriers 63 and 68 and adapted to control the action of the second advancing means 67 when a tube element 61 abuts against the first barrier 63 by its severed and welded side 70; these detection means 69 cut off the action of the second advancing means 67 when this tube element 61 abuts against the second barrier 68 by its side 2 comprising the slit and puts in action the opening device E which carries out its work on the severed side 70 of the tube element 61 which bears against the first barrier 63.

The first advancing means 62 are advantageously constituted by nozzles 71 projecting jets of air 72 onto the tube element 61, and the second advancing means are advantageously constituted by a roller 73 rotating about an axis parallel to the direction $D_1$, this roller 73 projecting slightly above the plate 60 between this plate 60 and the second barrier 68.

The detection means 69 are advantageously constituted by flux emitters 74 (emitting a flux of air of a flux of light) and flux receivers 75 respectively disposed on opposite sides of the plane of the plate with a spacing permitting the passage of a tube element 61.

The device D for positioning and orienting the tube elements 61 has the role of positioning the severed side 70 of each tube element 61 against the removable barrier 63 and of positioning the edge 2 of this tube element comprising the slit against the barrier 68, which gives the corner of the tube element 61 which bears against the barriers 63 and 68 a determined position and orientation.

In order to do this, each tube element 61, after having been projected onto the plate 60, is moved on this plate by the jets of air 72. When its side 70 approaches the barrier 63 supposed to be in its lowered position as shown in FIG. 5, the flux emitted by the emitter 74 is interposed and the receivers 75 control the actuation of the roller 73. This roller 73 moves the bag element 61 until the moment when its edge 2 comprising the slit abuts against the barrier 68, which moment is detected by the receivers 75 which then control the actuation of the opening device E. When the opening device E has finished its work, the shaft 65 is driven in rotation and the barrier 63 is raised, which permits the passage of the tube element 61 towards the second welding device G. The barrier 63 is then lowered and the positioning and orienting device D is ready to receive another tube element 61.

Figure 6:
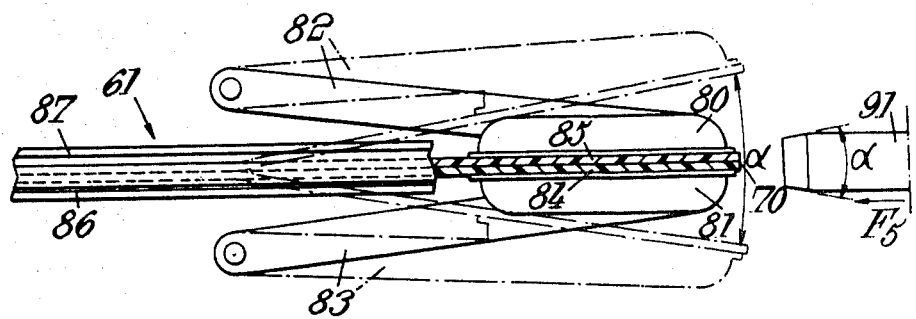
FIG. 6 shows, in side view with parts removed, an opening device of the apparatus of FIG. 1.
Figure 7:
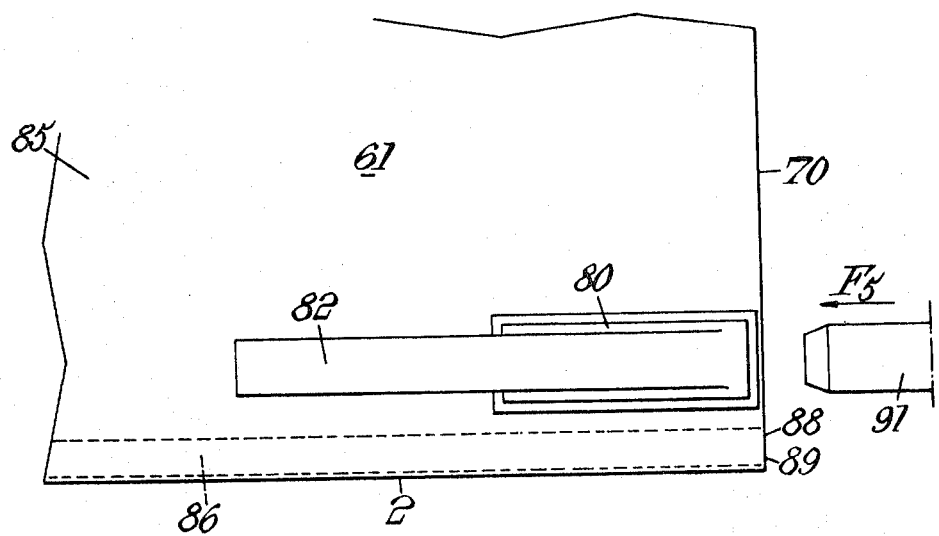
FIG. 7 shows in top view with parts removed, the opening device of FIG. 6.

The opening device E (FIG. 6) advantageously comprises two vacuum fingers 80 and 81 carried by pivoting arms 82 and 83. These vacuum fingers 80 and 81 engage the walls 84 and 85 of a tube element 61 along surfaces adjacent both to the complementary male and female fastener elements 86 and 87 and to the severed side 70 of this tube element 61 (position of these fingers and arms shown in solid lines) and then open these walls 84 and 85 and the ends 88 and 89 of the fastener elements by the above-mentioned determined angle $\alpha$ (position of the fingers and arms shown in broken lines). The pivoting arms 82 and 83 are disposed on opposite sides of the plane of the plate 60, and a space 90 (FIG. 5) is left between the barrier 63 and 68 for permitting the maneuvering of the vacuum fingers 80 and 81 and the threading on of a slider in the direction of the slit, onto the ends 88 and 89 of the complementary fastener elements 85 and 86 which are disposed parallel to the barrier 68 in the neighborhood of this barrier 68.

The vacuum fingers 80 and 81 maintain the walls 84 and 85 of the tube element 61 by suction, and the opening of these vacuum fingers by the determined angle $\alpha$ leads to the opening of the walls 84 and 85 and the disengagement of the ends 88 and 89 of the complementary fastener elements 86 and 87 which are thus maintained opened with the determined angle $\alpha$.

In order to reinforce this action, the opening device E advantageously comprises an element 91 in the form of a wedge presenting the above-mentioned angle $\alpha$. This wedge 91 is inserted between the opened walls 84 and 85, in the direction of the arrow $F_5$, in order to separate the complementary fastener elements 86 and 87 along a length greater than the length of a slider, the walls 84 and 85 being respectively interposed between the wedge 91 and the vacuum fingers 80 and 81.

In place of the wedge 91 a pair of blades, movable with respect to each other, can be provided. These blades are applied one against the other and are inserted between the opened walls 84 and 85, and these blades are then opened with respect to each other in order to separate the ends 88 and 89 of the complementary fastener elements 86 and 87, the walls 84 and 85 being respectively interposed between the blades and the vacuum fingers 80 and 81.

The opening device E advantageously further comprises means (not shown) for directing a jet of air towards the interior of the tube element 61 between the opened walls 84, 85.

The guiding device F threads, one by one, sliders having a given orientation onto the ends 88 and 89, thus opened, of the complementary fastener elements 86 and 87 of each tube element 61, along the direction of the slit, and moves the slider considered along a distance greater than the length of this slider.

The second welding device G (shown schematically in FIG. 1) comprises two welding blades 92 and 93 for shock welding the severed edges 70 of each bag element 61 and the ends of the complementary fastener elements 86 and 87.

The welding blade 93 welds the first severed edge and is fixed; the welding blade 92 welds the second severed edge and occupies an adjustable position with respect to the blade 93 for permitting the welding of tube elements 61 of different dimension. Each welding blade 92 or 93 comprises a notch permitting the welding of the ends of the complementary fastener elements 86 and 87 and cooperates with an anvil 94, 95 which is actuated by an electromagnet (not shown) for permitting the shock welding.

Shock welding is desirable since the thickness of the tube element varies considerably in the neighborhood of the complementary fastener elements 86 and 87. The welding cycle is short.

The tube elements 61 thus form bags which are disposed by the stacking device H on a conveyor (not shown) provided with a counter for counting the number of bags of each stack.

Various modifications and changes can be made to the particular embodiment described, without departing from the spirit or scope of this invention.

What I claim is:

1. Apparatus for making bags from a flattened tube of synthetic material, having, along one of its edges, a longitudinal slit closed along its entire length by a seam formed by mated male and female fastener elements provided in the neighborhood of this slit and carried respectively by the two lips of the slit, said apparatus comprising:

a supply for supplying, with an intermittent advance, said flattened tube;

a cutting device receiving said flattened tube for effecting, during each stop of the advance of the tube, a transverse cut severing, from said one edge of the tube, the complementary fastener elements and the tube along only a portion of its width;

a first welding device for effecting, during each stop of the advance of the tube, a first transverse weld of the walls of the tube, in line with each cut, along the rest of the width of this tube;

a separation device for separating from the tube, during each stop of the advance of said tube, the tube element delimited by said cuts and welds;

an opening device for opening, by a determined angle, the severed ends of the complementary fastener elements at one side of each tube element;

a guiding device for threading a slider onto the thus opened ends of the complementary fastener elements along the longitudinal direction of said seam, and for moving this slider along the fastener considered by a distance greater than the length of the slider;

a second welding device for effecting second transverse welds, in line with said first transverse welds, thus joining together the severed portions of each tube element; said separation device comprising two superimposed, continuously moving, belt conveyors, the lower conveyor carrying the flattened tube on its conveying surface and the upper conveyor being adapted to effect an alternating movement, such that the flattened tube is, after each cutting and welding-operation on the tube, temporarily gripped between at least a portion of the conveying surfaces of the two conveyors and is thus subjected to traction causing the separation of a tube element.

2. Apparatus according to claim 1, wherein the upstream portions of the conveying surfaces of the two conveyors (with respect to the direction of the advance of the tube between these conveying surfaces) are permanently adjacent to one another, and wherein a driving roller of the upper belt conveyor is adapted to effect, with respect to the lower conveyor, and alternating movement in the course of which it brings the rest of the conveying surfaces of said conveyor adjacent to each other.

3. Apparatus according to claim 2, wherein said lower conveyor comprises, interposed between its belts, metal T-section bars having a low coefficient of friction with respect to the flattened tube and having, at the level of the conveying surface of said lower conveyor, a plane face, and wherein the driving roller of the upper conveyor comprises toroidal rings made of a material having a high coefficient of friction with respect to the flattened tube, these rings being disposed such that, when the driving roller brings the rest of the conveying surfaces adjacent to each other, these rings urge the flattened tube against the T-section bars, and exert a supplementary traction on the tube.

4. Apparatus for making bags from a flattened tube of synthetic material, having, along one of its edges, a longitudinal slit closed along its entire length by a seam formed by mated male and female fastener elements provided in the neighborhood of this slit and carried respectively by the two lips of the slit, said apparatus comprising:

a supply for supplying, with an intermittent advance, said flattened tube;

a cutting device receiving said flattened tube for effecting, during each stop of the advance of the tube, a transverse cut severing, from said one edge of the tube, the complementary fastener elements and the tube along only a portion of its width;

a first welding device for effecting, during each stop of the advance of the tube, a first transverse weld of the walls of the tube, in line with each cut, along the rest of the width of this tube;

a separation device for separating from the tube, during each stop of the advance of said tube, the tube element delimited by said cuts and welds;

an opening device for opening, by a determined angle, the severed ends of the complementary fastener elements at one side of each tube element;

a guiding device for threading a slider onto the thus opened ends of the complementary fastener elements along the longitudinal direction of said seam, and for moving this slider along the fastener considered by a distance greater than the length of the slider;

and a second welding device for effecting second transverse welds, in line with said first transverse welds thus joining together the severed portions of each tube element, wherein said opening device comprises two vacuum fingers carried by pivoting arms for engaging the walls of a tube element along the surfaces which are adjacent both to the complementary fastener elements and to a severed side of the tube element, and for then opening these walls from each other, together with the ends of the fastener elements, by said determined angle.

5. Apparatus according to claim 4, wherein said opening device comprises an element in the form of a wedge presenting said determined angle and adapted to be inserted between the opened walls of the tube element for opening the complementary fastener elements along a length greater than the length of a slider.

6. Apparatus according to claim 4, wherein said opening device comprises means for directing a jet of air towards the interior of the tube element between the opened walls.

7. Apparatus for making bags from a flattened tube of synthetic material, having, along one of its edges, a longitudinal slit closed along its entire length by a seam formed by mated male and female fastener elements provided in the neighborhood of this slit and carried respectively by the two lips of the slit, said apparatus comprising:

a supply for supplying, with an intermittent advance, said flattened tube;

a cutting device receiving said flattened tube for effecting, during each stop of the advance of the tube, a transverse cut severing, from said one edge of the tube, the complementary fastener elements and the tube along only a portion of its width;

a first welding device for effecting, during each stop of the advance of the tube, a first transverse weld of the walls of the tube, in line with each cut, along the rest of the width of this tube;

a separation device for separating from the tube, during each stop of the advance of said tube, the tube element delimited by said cuts and welds;

an opening device for opening, by a determined angle, the severed ends of the complementary fastener elements at one side of each tube element;

a guiding device for threading a slider onto the thus opened ends of the complementary fastener elements along the longitudinal direction of said seam, and for moving this slider along the fastener considered by a distance greater than the length of the slider;

and a second welding device for effecting second transverse welds, in line with said first transverse welds, thus joining together the severed portions of each tube element further, comprising a positioning and orientating device for presenting to said opening device each tube element coming from said separation device, so that said opening device can carry out its work.

8. Apparatus according to claim 7, wherein said device for positioning and orientating the tube elements comprises:

a plate on which the separation device successively projects the tube elements, flat and along a determined direction parallel to the fastener elements of the tube element;

first advancing means for advancing a tube element along that direction towards a first barrier which borders the plate perpendicularly to said direction and which is removable;

second advancing means for advancing a tube element towards a second barrier which borders the plate parallel to said direction;

and detection means disposed along said barriers for starting the action of the second advancing means when a tube element abuts against the first barrier by its severed and welded side, these detection means cutting off the action of the second advancing means when this tube element abuts against the second barrier by its side comprising the fastener elements and actuating the opening device which carries out its work on the severed side of the tube element which bears against the first barrier.

9. Apparatus according to claim 8, wherein said first advancing means comprise nozzles projecting jets of air onto the tube element, and wherein said second advancing means comprise a roller rotating about an axis parallel to said direction and projecting slightly above the plate, between this plate and the second barrier.

10. Apparatus according to claim 8, wherein said detection means comprise flux emitters and flux receivers respectively disposed on opposite sides of the plane of the plate with a spacing permitting the passage of a tube element.

11. A mechanism for forming bags with pressure-closable releasably interlocking elements extending along one edge with sliders for the elements from a continuous tube of plastic material having lips along a first longitudinal edge of the tube and an interlocking element carried by each lip comprising;

means forming a transverse cut in the tube laterally severing the tube from said longitudinal edge through said elements, means separating the lips and the elements at the cut edge, means moving a slider over the separated elements and positioning the slider at a location spaced inwardly from the cut edge, and means sealing the edges of the layers formed by said cut after said slider is apaced inwardly.

12. A mechanism in accordance with claim 11 including means forming a second transverse cut from the longitudinal edge opposite the first edge and sealing the edges of the layers at said second cut prior to moving the slider over the lips.

UNITED STATES PATENT OFFICE
CERTIFICATE OF CORRECTION

Patent No. 3,607,534            Dated September 21, 1971

Inventor(s)    Isaj Gutman

It is certified that error appears in the above-identified patent and that said Letters Patent are hereby corrected as shown below:

Col. 1, line 3, change "apparatus" to --apparatuses--;

line 65, after "further", change "comprising" to --comprises--.

Col. 2, line 61, after "polyethylene", insert --this tube 1 having, along a first of its longitudinal edges 2, a longitudinal slit which is closed along its entire length by mated complementary male and female pressure closable releasably interlocking fastener elements (not shown in detail in Figure 1) provided adjacent the slit. The lips are the edges of the layers of the tube, and the lips of the slit carry said interlocking elements;--

Col. 3, line 3, after "separation", insert --device--;

line 23, change "light" to --eight--.

Col. 5, line 2, change "Tisection" to --T-section--;

line 7, change "with" to --shown--.

line 60, change "interposed" to --intercepted--.

Col. 7, line 45, change "conveyor" to --conveyors--.

Col. 10, line 15, change "apaced" to --spaced--.

Signed and sealed this 18th day of July 1972.

(SEAL)
Attest:

EDWARD M. FLETCHER, JR.          ROBERT GOTTSCHALK
Attesting Officer                Commissioner of Patents